US009064494B2

United States Patent
Holtel

(10) Patent No.: US 9,064,494 B2
(45) Date of Patent: Jun. 23, 2015

(54) METHOD AND DEVICE FOR AUTOMATIC RECOGNITION OF GIVEN KEYWORDS AND/OR TERMS WITHIN VOICE DATA

(75) Inventor: Stefan Holtel, Aying (DE)

(73) Assignee: VODAFONE GMBH, Duesseldorf (DE)

( * ) Notice: Subject to any disclaimer, the term of this patent is extended or adjusted under 35 U.S.C. 154(b) by 996 days.

(21) Appl. No.: 12/807,750

(22) Filed: Sep. 13, 2010

(65) Prior Publication Data

US 2011/0125501 A1 May 26, 2011

(30) Foreign Application Priority Data

Sep. 11, 2009 (EP) ..................... 09170089

(51) Int. Cl.
- G10L 21/00 (2013.01)
- G10L 25/00 (2013.01)
- G10L 15/22 (2006.01)
- H04M 3/56 (2006.01)
- G10L 15/08 (2006.01)

(52) U.S. Cl.
CPC ............ G10L 15/22 (2013.01); H04M 3/567 (2013.01); G10L 2015/088 (2013.01)

(58) Field of Classification Search
CPC ....... G10L 15/26; G10L 15/265; G10L 15/22; H04M 3/567; H04M 3/42221; G06F 17/2765; G06F 17/2785; G06F 17/279
USPC ................................ 704/270–275
See application file for complete search history.

(56) References Cited

U.S. PATENT DOCUMENTS

| | | | | |
|---|---|---|---|---|
| 4,773,093 A | * | 9/1988 | Higgins et al. | 704/247 |
| 4,783,803 A | * | 11/1988 | Baker et al. | 704/252 |
| 5,619,555 A | * | 4/1997 | Fenton et al. | 379/88.11 |
| 5,839,109 A | * | 11/1998 | Iwamida | 704/271 |
| 6,173,259 B1 | * | 1/2001 | Bijl et al. | 704/235 |
| 6,332,122 B1 | * | 12/2001 | Ortega et al. | 704/270 |
| 6,363,346 B1 | | 3/2002 | Walters | |

(Continued)

FOREIGN PATENT DOCUMENTS

| | | |
|---|---|---|
| EP | 1 191 772 A2 | 3/2002 |
| WO | WO 01/13362 A1 | 2/2001 |

Primary Examiner — Eric Yen
(74) Attorney, Agent, or Firm — Kriegsman & Kriegsman

(57) ABSTRACT

The present invention relates to a method of and a device (30) for automatic recognition of given keywords and/or terms within voice data (25) of a talk between at least two participants, said voice data (25) being continuously compared during said talk with said given keywords and/or terms (26) with regard to the occurrence of said given keywords and/or terms (26) within said voice data (25). In order to provide a solution which guarantees that topics which should be part of a talk are actually dealt with during said talk, the method is characterized in that a visualized representation (48) of the results (45) of said comparison is presented to at least one participant during the talk. A device (30) for automatic recognition of given keywords and/or terms (26) within voice data (25) of a talk between at least two participants comprises a comparator unit (41) for continuously comparing said voice data (25) with said given keywords and/or terms (25) during said talk with regard to the occurrence of said given keywords and/or terms (26) within said voice data (25); and means (46) for transforming the results (45) of said comparison into a visualized representation (48) and for presenting said visualized representation (48) of the comparison results (45) to at least one participant during the talk.

15 Claims, 1 Drawing Sheet

(56) References Cited

U.S. PATENT DOCUMENTS

| | | | |
|---|---|---|---|
| 6,477,491 B1* | 11/2002 | Chandler et al. | 704/235 |
| 6,754,631 B1* | 6/2004 | Din | 704/270 |
| 6,973,428 B2* | 12/2005 | Boguraev et al. | 704/251 |
| 7,117,152 B1* | 10/2006 | Mukherji et al. | 704/235 |
| 8,121,269 B1* | 2/2012 | Hession et al. | 379/93.01 |
| 2001/0021909 A1* | 9/2001 | Shimomura et al. | 704/275 |
| 2001/0041977 A1* | 11/2001 | Aoyagi et al. | 704/246 |
| 2002/0178002 A1* | 11/2002 | Boguraev et al. | 704/235 |
| 2003/0182122 A1* | 9/2003 | Horinaka et al. | 704/270 |
| 2003/0235279 A1* | 12/2003 | Richomme | 379/88.15 |
| 2004/0030543 A1* | 2/2004 | Kida et al. | 704/8 |
| 2004/0044517 A1* | 3/2004 | Palmquist | 704/7 |
| 2004/0073424 A1 | 4/2004 | Geppert et al. | |
| 2005/0144013 A1* | 6/2005 | Fujimoto et al. | 704/277 |
| 2005/0154995 A1* | 7/2005 | Miller et al. | 715/772 |
| 2005/0256717 A1* | 11/2005 | Miyata et al. | 704/270 |
| 2005/0261902 A1* | 11/2005 | Bushey et al. | 704/243 |
| 2007/0201636 A1* | 8/2007 | Gilbert et al. | 379/88.14 |
| 2007/0265903 A1* | 11/2007 | Blair et al. | 705/9 |
| 2008/0045286 A1* | 2/2008 | Setty | 463/9 |
| 2008/0201143 A1* | 8/2008 | Olligschlaeger et al. | 704/235 |
| 2008/0229192 A1* | 9/2008 | Gear et al. | 715/268 |
| 2008/0316945 A1* | 12/2008 | Endo et al. | 370/260 |
| 2009/0083183 A1* | 3/2009 | Rao et al. | 705/50 |
| 2009/0306979 A1* | 12/2009 | Jaiswal et al. | 704/235 |
| 2010/0305945 A1* | 12/2010 | Krishnaswamy et al. | 704/235 |
| 2011/0191672 A1* | 8/2011 | Schodl et al. | 715/273 |
| 2012/0179465 A1* | 7/2012 | Cox et al. | 704/235 |
| 2012/0269185 A1* | 10/2012 | Castleman et al. | 370/352 |

* cited by examiner

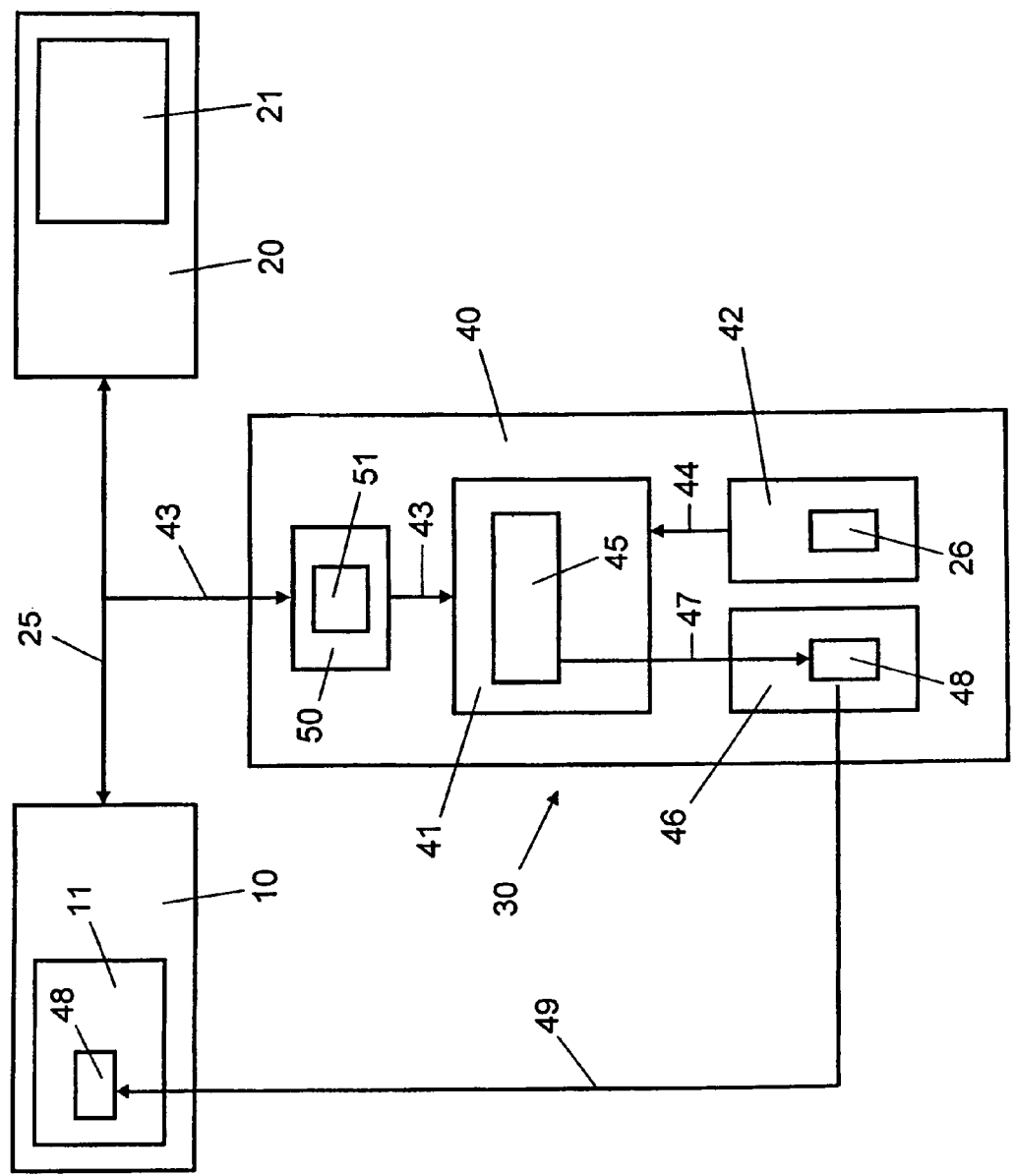

METHOD AND DEVICE FOR AUTOMATIC RECOGNITION OF GIVEN KEYWORDS AND/OR TERMS WITHIN VOICE DATA

The present invention relates to voice data recognition, and more particularly to a method of automatic recognition of given keywords and/or terms within voice data of a talk between at least two participants according to the preamble of claim 1, and a device for automatic recognition of given keywords and/or terms within voice data of a talk between at least two participants.

Automatic recognition of voice data of a talk makes it possible to analyse such a talk with regard to the occurrence of specific keywords and/or terms within said voice data. It has been suggested in US 2004/0073424 A1 to analyse voice data which are exchanged during a telephone conversation. The voice data are analysed by a voice recognition system and converted into text data. Specific keywords are extracted from said text data. The extracted keywords can be graphically displayed.

It is a problem with such a method that the voice data are processed after the telephone conversation has been finished. Thus, the known solution describes a method of subsequent analysis.

During a talk between at least two participants, for example during a telephone conversation, it is often a problem that topics which should be part of said talk, are not dealt with during said talk, since the participants forget to talk about them. Generally, participants of a talk have the need to recall major content from a talk later on. However, by forgetting to talk about specific topics they will miss the opportunity to retrieve such major contents afterwards. In such a situation the participants are forced to talk for a second time which is time consuming. In other situations there is no chance for a second talk. This might result in the uselessness of the first talk or in the misinterpretation of the value and/or the importance of specific topics mentioned during the talk.

It is the object of the present invention to provide a method and device for automatic recognition of given keywords and/or terms within voice data which allow overcoming those drawbacks as mentioned before. More particularly, it is the object of the present invention to provide a solution which guarantees that topics which should be part of a talk are actually dealt with during said talk.

The object is solved by the method comprising those features according to independent claim 1, and by the device comprising those features according to independent claim 11. Additional features and details of the invention are evident from the dependent claims, from the description and from the drawing. Features and details, which are described with regard to the method according to the present invention, are effective with regard to the device according to the present invention as well, and vice versa.

The invention is based on the finding that the above problem can be solved by giving a feedback to at least one participant of a talk during the talk. It is a general finding of the present invention that the method is performed while a talk is in progress. Thus, the present invention does not provide a method of subsequent analysis as being disclosed in US 2004/0073424 A1.

The present invention provides a real time visual talk feedback to at least one participant of said talk. A benefit of the present invention is an easy way to get instant feedback on, particularly weighed, relevance of given keywords and/or terms during a talk. It is therefore a simple but effective solution to retrieve past talks as well. In particular, the present invention provides a suitable support for participants of a call, who are dissatisfied with forgetting or misinterpreting the relevance of specific topics during a talk, or who are dissatisfied with the requirement to redirect a talk with the focus on specific topics due to a missing feedback mechanism.

According to a first aspect, the problem is solved by a method of automatic recognition of given keywords and/or terms within voice data of a talk between at least two participants, said voice data being continuously compared during said talk with said given keywords and/or terms with regard to the occurrence of said given keywords and/or terms within said voice data. The method is characterized in that a visualized representation of the results of said comparison is presented to at least one participant during the talk.

According to the method of the present invention there is provided an automatic recognition of given keywords and/or terms. In this context, a "keyword" can be a significant word in particular, and a "term" can particularly be a word or expression that has a precise meaning in some uses or is peculiar to a subject or topic. Keywords and/or terms can be non-hierarchical and assigned to a piece of information in a talk. They can help describing an item and allow finding said item within said talk, for example by browsing or searching.

Those keywords and/or terms occur within voice data of a talk. A talk can be, for example, a telephone conversation or a telephone call. For example, a call can be an established audio link between at least two callers, who are participants of said call. However, a call can even be enhanced to a group of participants who join a conference call. A call can comprise one or more call themes which are preferably selected, mostly relevant, topics of a call and which can preferably be automatically extracted. During a talk or call, voice data are exchanged between the participants. Voice data are audio data for example.

According to the present invention, the talk takes place between at least two participants. With respect to a talk being a call, a participant can be defined as a caller or callee for example. Generally, a caller is an individual calling someone. A callee is someone being called by another individual. Caller and/or callee can be participants in a conference call as well.

In a first step of the method according to the present invention, said voice data being continuously, particularly electronically, compared during said talk with said given keywords and/or terms with regard to the occurrence of said given keywords and/or terms within said voice data. This comparison step can be performed by use of different methods and means or devices. Examples of preferred embodiments, which however do not limit the scope of the present invention, are described further below.

Preferably, it is checked or weighed, whether, and if, how often a given keyword and/or term occurs during said talk.

Based on the results of said comparison step, a visualized representation of said comparison results is generated. Preferably, the visualized representation allows at least one participant to control in which direction the talk is changing or guided. In a preferred embodiment the visualized representation is such that it is possible to control without any further interpretation in which direction the talk is changing or guided. Examples of preferred embodiments, which however do not limit the scope of the present invention, are described further below.

Finally, the results of said comparison are, preferably continuously, presented to at least one participant during the talk.

Preferably, the given keywords and/or terms are talk type related keywords and/or terms. For example the given keywords and/or terms can be related to specific topics and/or can comprise a specific language such as specific technical language, project language, company language and the like. In any case it is advantageous that the given keywords and/or terms are relevant to the contents of the talk between the participants.

Advantageously, the given keywords and/or terms are stored within a data file. Such a data file establishes some kind of a keyword/term-list, said list comprising such keywords and/or terms which shall be identified within voice data of a talk. In such a case it is preferable, that the comparison of the voice data with the given keywords and/or terms stored within said data file is executed within a processing unit. During the comparison step the processing unit accesses said data file at least temporarily. The data file can be stored within a storage unit. The storage unit can be part of the processing unit or the device for automatic recognition of given keywords and/or terms within voice data. Alternatively the storage can be run separately, whereby the processing unit is connected to the storage unit at least temporarily.

If a data file with given keywords and/or terms is used, it is preferable that the data file of given keywords and/or terms is generated by at least one participant. In such a case, the given keywords and/or terms can be defined by a participant in advance of a talk. Thus, it is possible to create individual keywords and/or terms for one specific talk. For example, a participant can generate said data file by using a data terminal such as a computer, a mobile phone or the like. Afterwards, the finished data file can be stored on his data terminal, within the above mentioned processing unit, within the device for automatic recognition of given keywords and/or terms within voice data, transferred to an external processing unit, to a server within a communications network or the like.

According to a different embodiment the data file of given keywords and/or terms can be provided as a predefined data file. In such a case, a predefined list of—preferably standardized—keywords and/or terms can be created by a third party, for example by the operator of a communications network. Afterwards the data file can be made available to the participants of the talk.

According to a preferred embodiment of the invention the comparison of the voice data with the given keywords and/or terms is executed within a processing unit. By use of a means for automatic voice recognition the voice data are converted into text data. The present invention is not limited to specific embodiments of such means.

Preferably, a means for automatic voice recognition is a system that is capable of converting a talk, for example a call, into plain text. Such a means is capable of converting spoken words into machine-readable input. However, for the purpose of the present invention it is sufficient that such means is capable to roughly recognize what has been spoken during the talk between the participants. After the voice data have been converted into text data the processing unit accesses said text data. Additionally, the processing unit accesses a data file of given keywords and/or terms. During a comparison step the given keywords and/or terms are compared with said text data within said processing unit. Matching keywords and/or terms are extracted from said text data. Finally, the extracted matching keywords and/or terms are displayed as a visualized representation.

For example the visualized representation can be displayed on the display of at least one communication terminal, which is associated to at least one participants of the talk. For example, the participants can use mobile phones or other telecommunication terminals as communication terminals, whereby the visualized representation is displayed on the display of at least one communication terminal.

According to an alternative embodiment, the visualised representation can be displayed on an external display, which, however, is associated to at least one participant of the talk. For example, the participants can use mobile phones or other telecommunication terminals as communication terminals to perform a call. However, the visualized representation is displayed on a display that is independent from the communication terminals. For example this display could be part of a personal computer or the like.

In the latter case, the generation of the visualized representation of the comparison results is preferably performed within a device for automatic recognition of keywords and/or terms, which does not have to be part of a communication terminal. Such a device, which is also described in greater detail with regard to the second aspect of the present invention, is advantageously capable to be linked to a communication terminal. Furthermore, such a device is preferably capable of visualizing the generated comparison results. The device can be, for example, be implemented within a notebook being currently close to the communication terminal, a desktop personal computer display on a working desktop or station, or the like. Suitable connections between the communication terminal and the device are for example Bluetooth-connections, USB links or the like.

Advantageously, a weighting procedure is performed for those given keywords and/or terms which occur within the voice data, said weighting procedure being performed with regard to the frequency of said given keywords and/or terms within said voice data, whereby the given keywords and/or terms which occur within said voice data, are displayed as a visualized representation according to their weight. According to one preferred embodiment, it can be counted by use of a counter device how often specific keywords and/or terms are used during the talk. In relation to the number of occurrence, the keywords and/or terms are converted into a visualized representation. According to another preferred embodiment, all given keywords and/or terms are displayed as a visualized representation at the beginning of the talk. If one of the keywords and/or terms is used during the talk, or if the frequency of one of the given keywords and/or terms used during the talk reaches a predefined threshold, said keyword and/or term will be deleted and therefore removed from the visualized representation. In such a case if all given keywords and/or terms have been sufficiently used during the talk the visualized representation will be empty.

For example, the visualized representation of the comparison results can be graphically presented by a diagram, for example by use of a bar graph, a pie chart or the like. In such a case the extension of the diagram, for example the length or dimension of the bar, the volume of a pie segment within the pie chart, or the like represent the comparison results, that is the frequency, how often a given keyword and/or term is used during a talk.

According to another embodiment, the visualized representation of the comparison results can be graphically presented by use of a call tag cloud. Preferably, a call tag cloud is an application for visualizing word frequencies within a talk or within text data which have been converted from such a talk. Advantageously, a call tag cloud is a tool for the visualization of a content space as a cloud of keywords and/or terms. The importance or activity or frequency of each keyword and/or term, that is the comparison results, is preferably indicated by the size or visual style of the keywords and/or terms within the tag cloud.

According to yet another embodiment the visualized representation of the comparison results can be graphically presented by deleting at least parts of said comparison results.

According to a preferred embodiment of the invention, a communication terminal is allocated to each participant of the talk. During a talk voice date are exchanged between those communication terminals and a visualized representation of the comparison results is displayed on at least one communication terminal of at least one participant, particularly on a display of the communication terminal. The present invention is not limited to specific types of communication terminals. Preferably, a communication terminal is a terminal for transmitting and/or receiving communication signals or data. For example, a communication terminal can be a telecommunication device, particularly a mobile phone, or the like.

Advantageously, the method is executed within a processing unit, said processing unit being provided on the operator side of a communications network. In such a case, the method can be performed and offered as a special service from the operator of a communication device, for example from the operator of a mobile telecommunications network.

According to another embodiment of the invention, the method is executed within a processing unit, said processing unit being part of a communication terminal, for example a mobile phone. Said communication terminal is being registered with a communications network, for example mobile telecommunications network.

According to a preferred embodiment of the invention a method is provided, wherein, in a first step, voice data of a talk, for example voice data of a telephone call, are converted into machine-readable text data. In a second step, these text data are analysed by comparing same with given keywords and/or terms. Thus, it can be counted how often such given keywords and/or terms occur within said text data during the talk. Those given keywords and/or terms which appear within said text data during the talk are extracted from said text data. Furthermore, the frequency of those given keywords and/or terms which occur within those text data during the talk is determined. The comparison results are transformed into a visualized representation which is presented to at least one participant during said talk.

According to a second aspect of the present invention, there is provided a device for automatic recognition of given keywords and/or terms within voice data of a talk between at least two participants, said communication device comprising a comparator unit for continuously comparing said voice data with said given keywords and/or terms during said talk with regard to the occurrence of said given keywords and/or terms within said voice data; and means for transforming the results of said comparison into a visualized representation and for presenting said visualized representation of the comparison results to at least one participant during the talk.

Such a device is capable of creating a graphical interpretation of specific keywords and/or terms in real time, whereby a visualized representation is being created on the basis of those voice data of a talk.

Advantageously the device is characterized by means for performing the above described method according to the present invention.

Preferably, such a device comprises means for automatic voice recognition for converting the voice data into text data.

The present invention is not limited to specific configurations of said device. Examples of preferred embodiments, which however do not limit the scope of the present invention, are described in the following:

In a preferred embodiment, the device is at least one component on the operator side of a communications network. According to a further embodiment, the device is at least one component of a communication terminal being registered with a communications network. The device can be configured as one single unit. According to another embodiment, the device can be configured in form of two or more elements, whereby those elements can be arranged separated from one another. Preferably, the device is part of a communications system.

A device for automatic recognition of given keywords and/or terms within voice data of a talk between at least two participants according to the present invention is preferably a device that converts text spoken during a talk, for example during phone calls, into machine-readable text. It is further adapted to calculate a graphical interpretation of given keywords and/or terms used during a talk by detecting and weighing a relative relevance of such given keywords and/or terms. It is one general effort of the device according to the present invention that it can provide a real-time feedback on the use of given keywords and/or terms during a talk. Furthermore, the device is capable of displaying the comparison results as a visualized representation during said talk. A cumbersome activity of identifying keywords and/or terms due to replaying audit recordings can be avoided. The relative weight of given keywords and/or terms during a talk can be grasped. The device according to the present invention gives an easy overview to all relevant keywords and/or terms at any time during a talk. Finally such a device can show as well how relevant keywords and/or terms can naturally emerge during the talk.

For a better understanding of the present invention a method of and a device for automatic recognition of given keywords and/or terms within voice data of a talk between at least two participants, embodying the present invention, will now be described by way of example, with reference to the accompanying drawing which shows schematically the components of the device of the embodiment and the procedure cycle running between those components.

In accordance with the embodiment, a first participant is provided with a communication terminal 10. The communication terminal 10 is configured as a mobile phone, said mobile phone comprising a display 11. A second participant is provided with a communication terminal 20. The communication terminal 20 is configured as a mobile phone as well, said mobile phone comprising a display 21.

Between both mobile phones 10, 20 voice data 25 of a talk are exchanged, that is a telephone conversation is taking place between the first participant and the second participant.

The method in accordance with the present embodiment begins, when the first participant with his mobile phone 10, for example the caller, wants to visualize his call to the second participant with his mobile phone 20, for example the callee.

For this purpose a device 30 for automatic recognition of given keywords and/or terms within voice data of a talk is provided. For example such a device 30 can be configured as a component of either one of mobile phones 10 or 20. According to a different embodiment, such a device 30 can be an independent component on the operator side of a communications network. The device 30 comprises a processing unit 40, including a comparator unit 41, a data file 42 with given keywords and/or terms 26, means 46 for transforming comparison results into a visualized representation, and means 50 for automatic voice recognition.

When the participants of the talk start talking, voice data 25 of said talk are received by comparator unit 41 in a first comparison step 43. In a preceding step, said voice data 25 are converted into plain machine-readable text data 51 by use of means 50 for automatic voice recognition. In a second comparison step 44, given keywords and/or terms 26 which are stored within data file 42, are received by comparator unit 41. Within comparator unit 41, said text data 51 are continuously compared during said talk with said given keywords and/or terms 26 with regard to the occurrence of said given keywords and/or terms 26 within said voice data 25. Matching keywords and/or terms 26 are extracted into a data file of comparison results 45. In addition comparator unit 41 counts the frequency how often those given keywords and/or terms 26 occur within said text data 51, and therefore, within said voice data 25.

During a transformation step 47, comparison results 45 are transformed into a visualized representation 48 of the comparison results 45. For example, the visualized representation 48 of the comparison results 45 can be graphically presented by a diagram, for example by use of bar graphs. In such a case the extension of the diagram, for example the length of the bars represent the comparison results 45, that is the frequency, how often a given keyword and/or term 26 is used during a talk.

During a final transmission step 49 the visualized representation 48 is transferred to the mobile phone 10 of the first participant and presented on its display 11.

Thus, a real time visual talk feedback is provided to the first participant of said talk who uses mobile phone 10. This participant gets instant feedback on, particularly weighed, relevance of given keywords and/or terms 26 during his talk to the second participant who uses mobile phone 20. It is an advantage of the present invention, that the method is performed while the talk is in progress.

LIST OF REFERENCE NUMERALS

10 Communication terminal
11 Display
20 Communication terminal
21 Display
25 Voice data
26 Given Keywords and/or terms
30 Device for automatic recognition of given keywords and/or terms within voice data of a talk
40 Processing unit
41 Comparator unit
42 Data file of given keywords and/or terms
43 Comparison step
44 Comparison step
45 Comparison results
46 Means for transforming the comparison results into a visualized representation
47 Transformation step
48 Visualized representation of the comparison results
49 Transmission step
50 Means for automatic voice recognition
51 Text data (converted from voice data)

The invention claimed is:

1. A method of automatic recognition of given keywords and/or terms within voice data of a talk between at least two participants, said voice data being continuously electronically compared during said talk with said given keywords and/or terms with regard to the occurrence of said given keywords and/or terms within said voice data,
characterized
in that during said comparison step it is checked, whether a given keyword and/or term occurs during said talk and, if the given keyword and/or term occurs during said talk, how often the given keyword and/or term occurs during said talk,
in that all given keywords and/or terms are displayed as a visualized representation at the beginning of the talk, and
in that if one of the keywords and/or terms is used during the talk or if the frequency of one of the given keywords and/or terms reaches a predetermined threshold, said one of the keywords and/or terms is removed from the visualized representation.

2. The method according to claim 1, characterized in that the given keywords and/or terms are talk type related keywords and/or terms.

3. The method according to claim 1, characterized in that the given keywords and/or terms are electronically stored within a data file, that the comparison of the voice data with the given keywords and/or terms is executed within a processing unit and that the processing unit accesses said data file at least temporarily.

4. The method according to claim 3, characterized in that the data file of given keywords and/or terms is generated by at least one participant or that the data file of given keywords and/or terms is provided as a predefined data file.

5. The method according to claim 1, characterized in that the comparison of the voice data with the given keywords and/or terms is executed within a processing unit, that the voice data are converted into text data by use of a means for automatic voice recognition and that the processing unit accesses said text data, that the processing unit further accesses a data file of given keywords and/or terms, that the given keywords and/or terms are compared with said text data within said processing unit, that matching keywords and/or terms are extracted from said text data, and that said extracted matching keywords and/or terms are displayed as a visualized representation.

6. The method according to claim 1, characterized in that a weighting procedure is electronically performed for those given keywords and/or terms which occur within the voice data, said weighting procedure being performed with regard to the frequency of said given keywords and/or terms within said voice data, and that the given keywords and/or terms which occur within said voice data, are displayed as a visualized representation according to their weight.

7. The method according to claim 1, characterized in that the visualized representation of the comparison results is graphically presented by a diagram, or by a call tag cloud, or by deleting at least parts of said comparison results.

8. The method according to claim 1, characterized in that a communication terminal is allocated to each participant of the talk, that during said talk voice data are exchanged between said communication terminals and that a visualized representation of the comparison results is displayed on at least one communication terminal of at least one participant.

9. The method according to claim 1, characterized in that the method is executed within a processing unit, said processing unit being provided on the operator side of a communications network.

10. The method according to claim 1, characterized in that the method is executed within a processing unit, said processing unit being part of a communication terminal being registered with a communications network.

11. A device for automatic recognition of given keywords and/or terms within voice data of a talk between at least two participants, said communication device comprising:
a comparator unit for continuously comparing said voice data with said given keywords and/or terms during said talk with regard to the occurrence of said given keywords and/or terms within said voice data, said comparator unit being adapted for checking, whether a given keyword and/or term occurs during said talk and, if the given keyword and/or term occurs during said talk, how often the given keyword and/or term occurs during said talk; and means for presenting, to at least one participant, a visualized representation of keywords and/or terms, the visualized representation including, at the beginning of the talk, all given keywords and/or terms and being modified during the talk to reflect comparison results so that if one of the given keywords and/or terms is used during the talk or if the frequency of one of the given keywords and/or terms reaches a predetermined threshold, said one of the keywords and/or terms is removed from the visualized representation.

12. The device according to claim 11, characterized by means for performing the method according to claim 1.

13. The device according to claim 11, characterized in that it comprises means for automatic voice recognition for converting the voice data into text data.

14. The device according to claim 11, characterized in that the device is at least one component on the operator side of a communications network.

15. The device according to claim 11, characterized in that the device is at least one component of a communication terminal being registered with a communications network.

\* \* \* \* \*